United States Patent
Kritt et al.

(10) Patent No.: US 8,959,169 B2
(45) Date of Patent: Feb. 17, 2015

(54) ELECTRONIC MESSAGE ALERTING (71) Applicant: International Business Machines Corporation, Armonk, NY (US)

(72) Inventors: Barry A. Kritt, Raleigh, NC (US); Thomas S. Mazzeo, Durham, NC (US); Sarbajit K. Rakshit, Kolkata (IN); Shawn K. Sremaniak, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/151,197

(22) Filed: Jan. 9, 2014

(65) Prior Publication Data
US 2014/0129653 A1 May 8, 2014

Related U.S. Application Data (63) Continuation of application No. 13/414,261, filed on Mar. 7, 2012, now abandoned.

(51) Int. Cl.
H04L 12/58 (2006.01)
G06Q 10/10 (2012.01)
H04L 12/18 (2006.01)

(52) U.S. Cl.
CPC .............. H04L 51/34 (2013.01); G06Q 10/107 (2013.01); H04L 51/24 (2013.01); H04L 12/1859 (2013.01); H04L 51/14 (2013.01)
USPC ......................................................... 709/206

(58) Field of Classification Search
CPC ....................................................... H04L 51/34
USPC ......................................................... 709/206
See application file for complete search history.

(56) References Cited

U.S. PATENT DOCUMENTS

| | | | |
|---|---|---|---|
| 7,673,000 B2 | 3/2010 | Smoot et al. | |
| 7,865,555 B2 * | 1/2011 | Willey | ........................... 709/206 |
| 2007/0050777 A1 * | 3/2007 | Hutchinson et al. | ........... 718/104 |
| 2009/0204624 A1 | 8/2009 | Basson et al. | |
| 2010/0199188 A1 * | 8/2010 | Abu-Hakima et al. | ........ 715/733 |
| 2010/0268682 A1 | 10/2010 | Lewis et al. | |
| 2010/0306332 A1 | 12/2010 | Law | |
| 2011/0055334 A1 | 3/2011 | Tivyan | |

OTHER PUBLICATIONS emailwire.com, "Survey of Email Recipient Preferences Shows HTML favored for Readability", May 13, 2003, Rocklin, CA, US [online], [retrieved on Oct. 4, 2011]. Retrieved from the Internet <URL: http://emailwire.com/release/Survey-of-Email-Recipient-Preferences-Shows-HTML-favored-for-Readability,html>.
U.S. Appl. No. 13/414,261, filed Mar. 7, 2012.

\* cited by examiner

*Primary Examiner* — Vivek Srivastava
*Assistant Examiner* — Sibte Bukhari (57) ABSTRACT

Embodiments of the present invention provide a system, method, and program product to provide a user creating an electronic message one or more alerts related to the content and addressees of the electronic message. A computer identifies the one or more addressees of the electronic message. The computer determines one or more alerts associated with each of the identified one or more addressees. The computer displays the alerts in a manner that each step is performed prior to the computer transmitting the electronic message for delivery to one or more addressees.

9 Claims, 6 Drawing Sheets

ELECTRONIC MESSAGE ALERTING

CROSS REFERENCE TO RELATED APPLICATION

This application is a Continuation Application of pending U.S. patent application Ser. No. 13/414,261 filed Mar. 7, 2012.

FIELD OF THE INVENTION

The present invention relates generally to electronic messaging, and more particularly to alerting of a message-sending user by comparing the content and recipients of the message with recipient preferences.

BACKGROUND

Electronic messaging has been widely adopted for business-related communications. Electronic messaging technologies such as e-mail and instant messaging can enable an organization to operate globally, while remaining cohesive and coordinated. In the context of a large organization, internal electronic messaging can be a powerful tool for the rapid exchange of information among many employees and can help employees identify and access each other's expertise as well as other sources of information.

Typically, however, as the size of an organization grows, so does the complexity of the business relationships within and external to the organization. Employees' expertise, collaborations, business and research projects, and various other business functions are often constantly evolving. Electronic communications preferences of recipients as companies and/or individuals are acquired over time by employees. Consequently, electronic communications to recipients that do not include preferences of the recipient can result in wasted time and resources.

One such scenario involves an individual who begins work in a new job function. When starting a new job function, the new employee does not have prior contact with clients and/or colleagues to know their preferences and other special needs. Specifically, the new employee does not know the clients and/or colleagues preferences and special needs pertaining to electronic messaging. In the past, companies have collected hard copies of preferences and special needs that require the new employee to read and re-read for each scenario, placing a considerable burden on the new employee until the new employee has these preferences and special needs memorized.

SUMMARY

Embodiments of the present invention provide a system, method, and program product to provide a user creating an electronic message one or more alerts related to the content and addressees of the electronic message. A computer identifies the one or more addressees of the electronic message. The computer determines one or more alerts associated with each of the identified one or more addressees. The computer displays the alerts in a manner that each step is performed prior to the computer transmitting the electronic message for delivery to one or more addressees.

DETAILED DESCRIPTION

In brief summary, exemplary embodiments of the present invention are practiced in the context of a graphical e-mail messaging client running on a computing device, where the exemplary embodiments are integrated with an existing e-mail messaging system and client. A user creates a message, including naming addressees and entering text into the body of the message. As the user composes the electronic message or upon clicking a "Send" button or a "View Message Preferences" button, the computer determines whether the addressees have preferences for display to the user.

If computer determines that no such informational preference alerts are applicable, the computing device transmits the message for delivery to the addressees. If the computing device determines that one or more of the addressees' preferences are applicable, the computing device displays an alert on the user interface to inform the user of those addressee preferences.

Embodiments of the present invention will now be described in detail with reference to the accompanying drawings.

Figure 1:
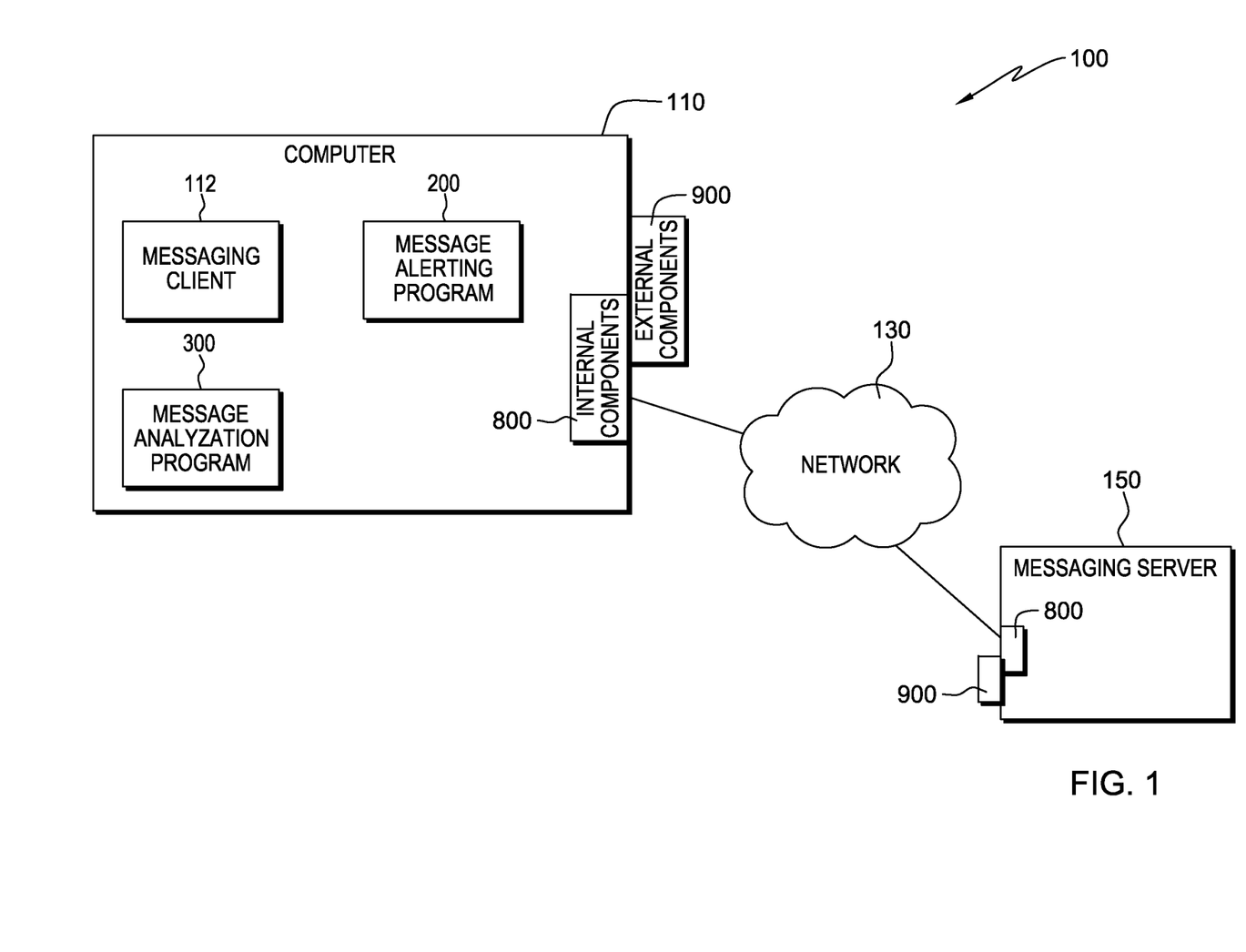
FIG. 1 is a functional block diagram of an addressee-based contextual message prompting system in accordance with an embodiment of the present invention.

FIG. 1 is a functional block diagram illustrating a message alerting system 100 in accordance with an embodiment of the present invention. Message alerting system 100 includes a computer 110 and a messaging server 150 interconnected over a network 130.

Computer 110 includes a messaging client 112 for managing electronic messages, a message alerting program 200 for alerting a user to addressee preferences, and a message analyzation program 300 for analyzing electronic messages for addressee preferences.

Computer 110 and messaging server 150 include internal components 800 and external components 900. Computer 110 and messaging server 150 can be laptop computers, desktop computers, specialized computer servers, or any other computer systems known in the art. In general, computer 110 and messaging server 150 can be any programmable electronic devices as described in further detail with regard to FIG. 6. In another embodiment, computer 110 represents a computer system utilizing clustered computers and components to act as a single pool of seamless resources when accessed through a network. For example, this implementation may be preferred for data centers and for cloud computing applications. Further, it should be understood that, for the purpose of illustration, FIG. 1 does not show other computer systems and elements which may be present when using an embodiment of the present invention, such as, for example, additional computer systems in communication with messaging server 150 used by message recipients to receive messages.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computer 110 and messaging server 150 in accordance with a desired embodiment of the invention.

Messaging server 150 includes a database containing predefined addressee preferences which, upon receiving a request from computer 110, messaging server 150 outputs to computer 110 via network 130. Messaging server 150 receives the outputted electronic messages of computer 110 via network 130 and delivers them to one or more recipients. In an example, messaging server 150 is an existing messaging system. In an example, computer 110 is in communication with a plurality of messaging servers 150 to enable message alerting system 100 to simultaneously support a plurality of electronic messaging technologies, such as, for example, e-mail, instant messaging, cellular network text messaging, blog posting, and social media messaging.

The predefined addressee preferences contained in the database of the messaging server 150 are obtained by user input, addressee input, and/or automatically such as by text mining techniques. Types of addressee preferences that may be stored in the database include, but are not limited to: whether addressee is a technical expert or not, whether addressee prefers long or short descriptions and/or explanations, whether addressee prefers all unanswered queries answered before answering new queries, whether addressee is color blind, whether addressee prefers attachments deleted or compressed, whether addressee prefers not to include links to advertisements, offensive language for addressee, etc.

In an example, messaging server 150 includes a database containing a plurality of informational messages that includes addressee preferences created by users who might receive electronic messages or send the electronic messages. In some examples, each informational message is associated with one or more text strings and the name and electronic address of the individual who created it. The phrase "text strings," as used in this specification, means a finite sequence of text characters such as, for example, keywords, topic tags, identification numbers, identification codes, and phrases. The text characters can include alphanumeric characters and symbols. An individual can also associate an informational message with a particular pattern of text strings, such as, for example, requiring that two text strings be present in the same sentence. The informational messages can be permanent or include an optional time period of applicability.

In an example the system is integrated with an existing messaging system that includes a knowledge based system. The knowledgebase system captures addressee preferences automatically and/or with a manual method. In examples, addressee can provide the knowledgebase system with addressee preferences, like the addressee is colorblind, etc. In another example, user can also provide the preferences of one or more addressees. In examples where the knowledgebase system captures addressee preferences automatically, text mining techniques can be used for the disclosure, such as, but not limited to: keyword/phrasing matching, probability theory, pattern matching, etc.

Figure 2:
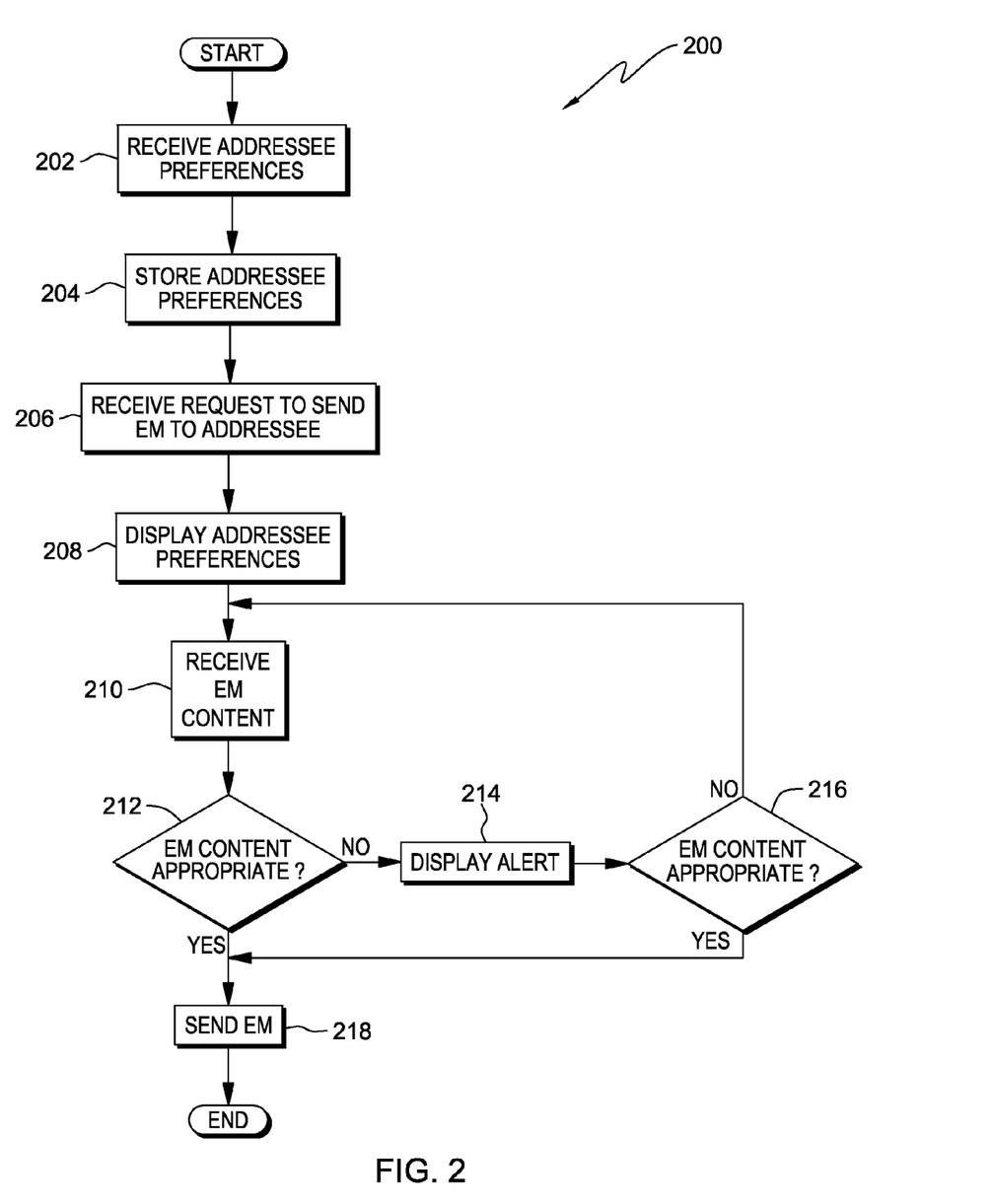
FIG. 2 is a flowchart illustrating the basic operational steps for an embodiment of the present invention.
Figure 4:
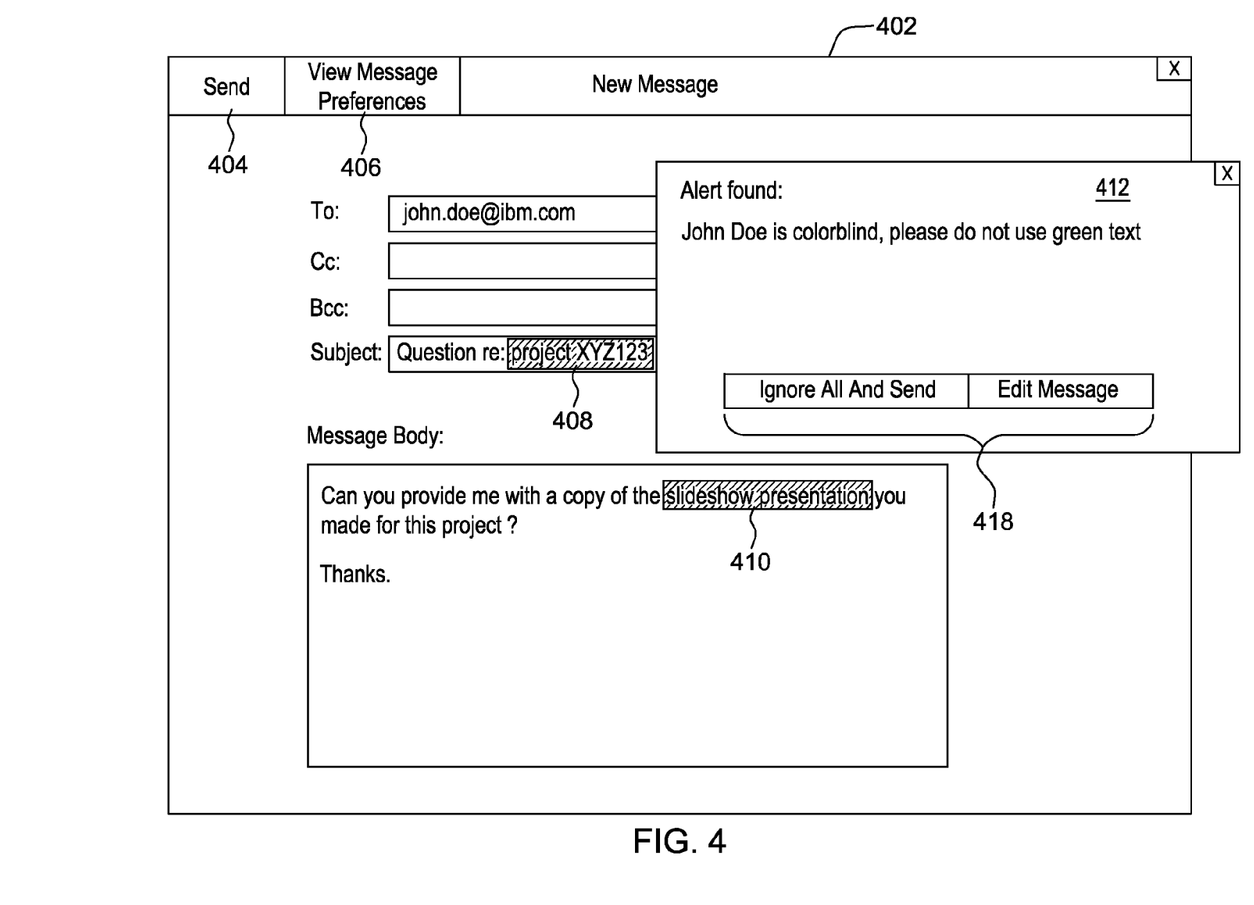
FIGS. 4 and 5 show basic illustrations of user interfaces for creating an electronic message and receiving alerts with a message alerting system in accordance with embodiments of the present invention.

FIG. 2 is a flow chart illustrating the basic operational steps of message alerting program 200. In step 202, message alerting program 200 receives addressee preferences to be stored in database of messaging server 150 (step 204). In one example, the addressee preferences are inputted by user through a user interface into database. In another example, the message analyzation program 300 identifies and acquires addressee preferences to be stored within database. In step 206, message alerting program 200 receives a request to send an electronic message, including one or more addressees and other content of the electronic message. Typically, electronic message is generated using messaging client 112 that is one or more software computer programs which are capable of being integrated with message alerting system 100, and which allow a user to create and view an electronic message, and transmit the electronic message to a messaging server 150. As depicted in FIG. 4, in an example, user enters text and any other content into a message form generated by messaging client 112, such as, for example, an e-mail message form containing "To:", "Cc:", "Bc:", "Subject:", and message body fields. In this example, e-mail message form includes, among others, a "Send" button and a "View Message Preferences" button, which user may select. Embodiments of the present invention can also include multiple separate or integrated messaging clients 112, and can support a plurality of electronic messaging technologies, such as, for example, e-mail, instant messaging, cellular network text messaging, blog posting, and social media messaging. One example of messaging client 112 used in exemplary embodiments is Lotus Notes® V8.5.3, available from International Business Machines Corporation.

In this example, in step 208, message alerting program 200 displays on UI for user viewing any applicable addressee preferences. In an example, the user may also select a "View Message Preferences" button in step 208 to initiate message alerting program 200 displaying addressee preference. In another example, message alerting program automatically displays addressee preferences when user inputs addressee information within the recipient portion of electronic message, or as user composes electronic message.

In step 210, message alerting program 200 receives user input through UI as the user enters text and any other content into a message form generated by messaging client 112, such as, for example, an e-mail message form containing "To:", "Cc:", "Bc:", "Subject:", and message body fields.

In step 212, message alerting program 200 determines if any predefined informational messages should be displayed to the user before computer 110 transmits the message to messaging server 150 for delivery to the addressee(s), by comparing the text data inputted by a user, based on the addressees and subject matter of the message, with the predefined addressee preferences contained within database.

In step 212, if message alerting program 200 determines that the text data inputted within the message, or other message preferences established do not violate any addressee preferences, in step 218, message alerting program 200 instructs messaging client 112 to proceed with sending the electronic message and, messaging client 112 transmits the electronic message to messaging server 150 for delivery to the message's addressees. In another embodiment, such as an embodiment utilizing a "View Message Preferences" button, upon a determination that the text data inputted within the message, or other message preferences established do not violate any addressee preferences, message alerting program 200 indicates this determination to the user and then permits the user to continue editing the electronic message back in step 210.

In step 212, if message alerting program 200 determines that the text data inputted within the message, or other message preferences established violate any addressee preferences, in step 214, message alerting program 200 displays an alert, such as informational message, associated with addressee preferences that were violated, on UI to alert user about addressee preferences. In an example, alert corresponds to each addressee and visually distinguishes for user the portions of the electronic message that correspond to alert, such as, for example, by highlighting, underlining, italicizing, or placing those portions in a different font color. In one embodiment, message alerting program 200 displays all informational messages in a single prompt window, as illustrated and explained in greater detail with regard to FIG. 4. In a preferred embodiment, message alerting program 200 displays each informational message in a separate prompt window near each identified violation, as illustrated and explained in greater detail with regard to FIG. 4. Depending on the content of each informational message created by an addressee, informational messages displayed to user may contain a suggested addressee, an alternative source of information, and programmable elements that the user can execute to automatically perform actions preferred by addressee.

In step 216, message alerting program 200 receives from the user instructions on how to proceed in response to displayed alerts. In an example, user decides to edit the electronic message or ignore alert and proceed with sending the electronic message in its current form and to the original addressees. If the user decides to edit the electronic message, in step 216 message alerting program 200 permits user to continue editing the electronic message with messaging client 112 back at step 210. If the user decides to ignore the informational messages and proceed with sending the electronic message in its current form and to the original addressees, message alerting program 200 instructs messaging client 112 to proceed with sending the electronic message and, in step 218, messaging client 112 transmits the electronic message to messaging server 150 for delivery to the message's addressees.

Operational steps 202 through 218 are illustrative of one or more embodiments of the present invention. It should be understood that the content of each step, as well as the order of operation, can be modified without departing from the spirit and intended scope of the present invention.

Figure 3:
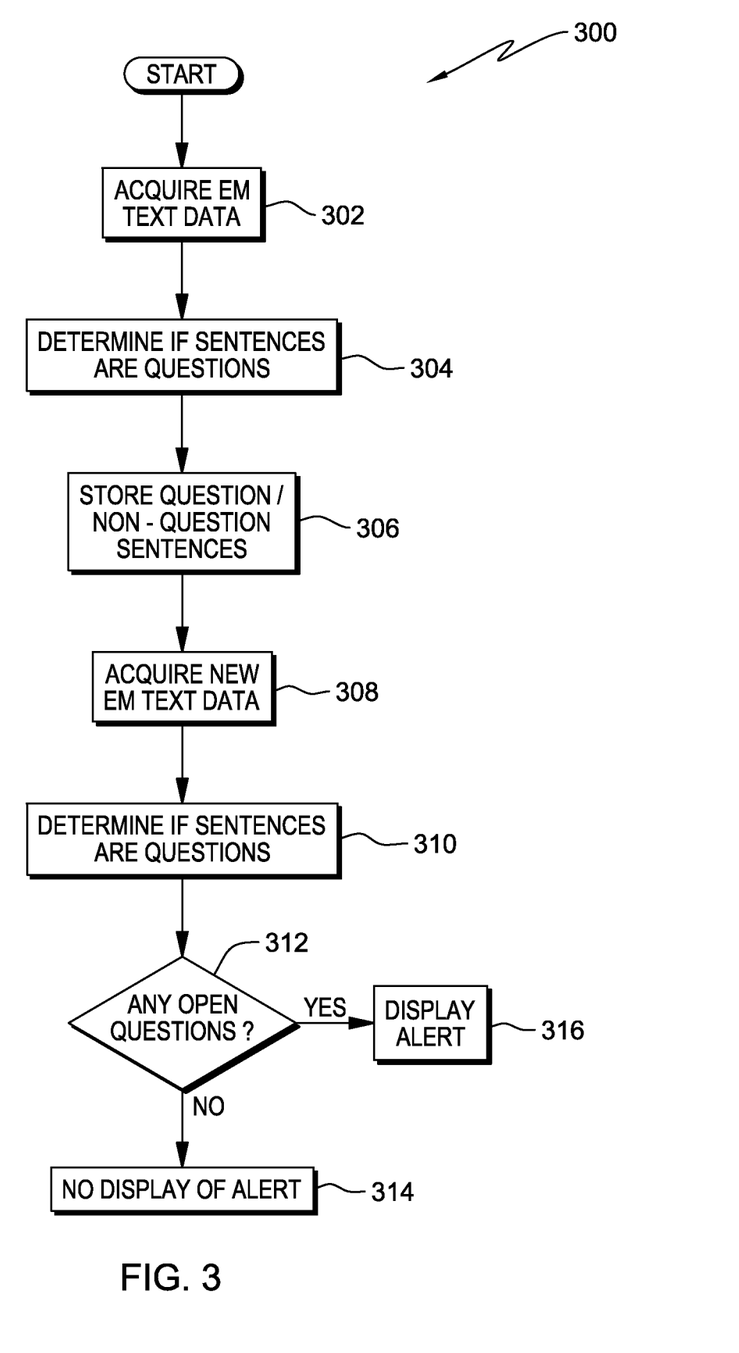
FIG. 3 is a flowchart illustrating the basic operational steps for an embodiment of the present invention.

FIG. 3 is a flow chart illustrating the basic operational steps of message analyzation program 300. In step 302, message analyzation program 300 acquires the text data of stored electronic messages sent to user from one or more addressees. In step 304, message analyzation program 300 determines what sentences are questions and what sentences are non-questions within acquired text data of stored electronic messages sent to user from one or more addressees. In step 306, message analyzation program 300 stores the sentences into database of messaging server 150 based on whether sentences are questions or non-question sentences. In step 308, message analyzation program 300 acquires the text data of new electronic messages sent to or from user from one or more addressees. In step 310, message analyzation program 300 determines what sentences are questions and what sentences are non-questions within acquired text data of new electronic messages sent to or from user from one or more addressees. In step 312, message analyzation program 300 compares new non-question sentences with stored question sentences to determine if all of addressee stored questions are answered. In step 312, if there are no open questions, there is no display of alert to user on UI (step 314). In step 312, if there are open questions, message analyzation program 300 displays alert on UI for user to view list of open questions (step 316).

FIG. 4 shows a basic illustrative user interface being operated by a hypothetical user to create an electronic message and receive informational messages with a message alerting system 100 in accordance with an embodiment of the present invention. Shown is an e-mail message form 402 that was generated, as a blank form, by messaging client 112. E-mail message form 402 includes "Send" button 404 and "View Message Preferences" button 406, as well as multiple text input fields, such as the "To:", "Subject:", and "Message Body:" fields.

In this example, prior to the user creating the e-mail message depicted, a hypothetical addressee john.doe@ibm.com ("John Doe") created two predefined informational messages. For example, John Doe may have been receiving many emails that include colors, and John Doe is colorblind. In the example depicted in FIG. 4, the user has now entered text into the text fields of e-mail message form 402, after which the user selected the "Send" button 404. Message alerting program 200 has identified John Doe's predefined informational messages for display to user because the user's message is addressed to "john.doe@ibm.com" and contains color that violates the predefined preferences of John Doe.

In the example depicted in FIG. 4, message alerting program 200 visually distinguishes for the user the portions of the e-mail message that match violated addressee preferences by highlighting those portions of the e-mail message, shown at 408 and 410. Message alerting program 200 displays for the user a single prompt window 412, which contains each of the addressee's predefined informational messages. At the bottom of single prompt window 412 are two command buttons 418. The user may select the "Ignore All and Send" button to disregard the informational messages and proceed with sending the message to "john.doe@ibm.com" in its current form. The user may select the "Edit Message" button and return to editing the e-mail message without sending it.

Had the user selected the "View Message Preferences" button 406 rather than the "Send" button 404, single prompt window 412 may include a single "Close and Edit Message" button (not shown) to enable the user to close single prompt window 412 and continue editing the e-mail message.

Figure 5:
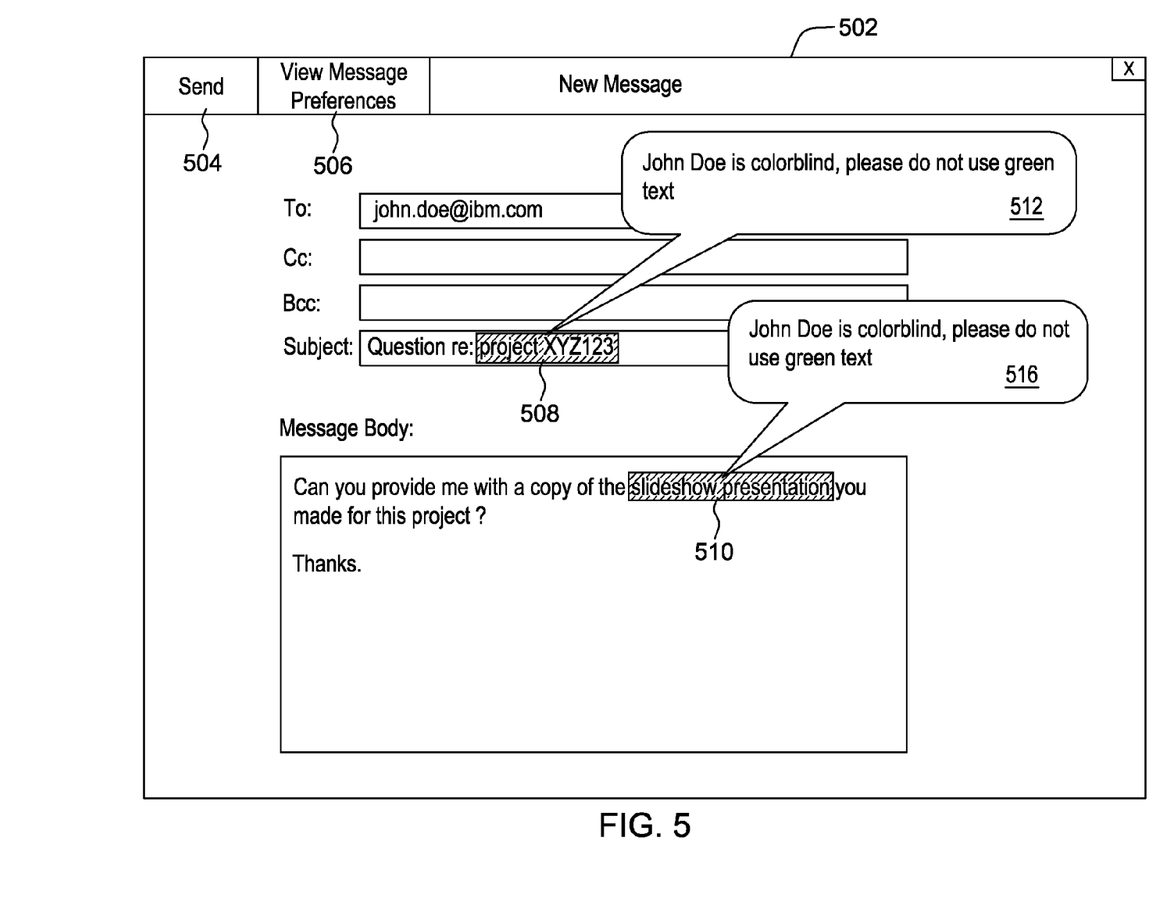

FIG. 5 shows another basic illustrative user interface being operated by a hypothetical user to create an electronic message and receive informational messages with a message alerting system 100 in accordance with an embodiment of the present invention. The illustrative user interface shown in FIG. 5 is based upon many of the same elements and the example scenario discussed with respect to FIG. 4. Accordingly, for an explanation of the example scenario and elements 502 through 510 please refer to the discussion of FIG. 4.

In the example depicted in FIG. 5, message alerting program 200 was initiated as user composed the message and it asynchronously retrieved the predefined alerts as user entered information associated with addressee preferences. Message alerting program 200 displays for the user multiple prompt windows 512 and 516. Each prompt window contains alert related to violated preferences of addressee (John Doe) and is located near the portion of e-mail message associated with that particular alert, shown at 508 and 510.

Figure 6:
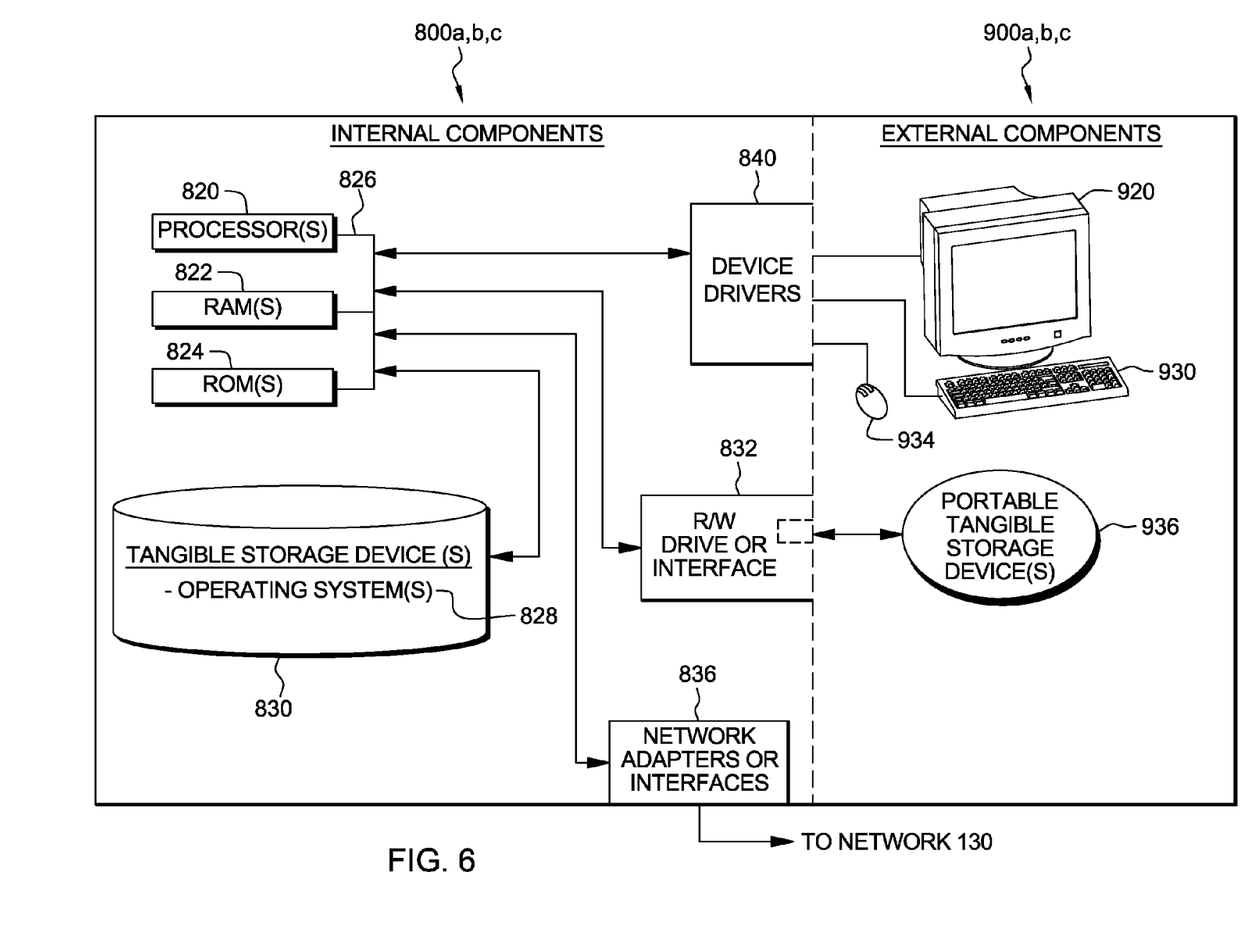
FIG. 6 is a block diagram of hardware and software within and external to the computing device and computer servers of FIG. 1 in accordance with an embodiment of the present invention.

FIG. 6 shows a block diagram of internal components 800 and external components 900 of a computer 110 and messaging server 150 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Computer system 800, 900 is representative of any electronic device capable of executing machine-readable program instructions. Computer system 800, 900 may be representative of a smart phone, a computer system, PDA, or other electronic devices. Examples of computing systems, environments, and/or configurations that may represented by computer system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 110 and messaging server 150 include respective sets of internal components 800 a, b, c and external components 900 a, b, c illustrated in FIG. 6. Each of the sets of internal components 800 a, b, c includes one or more processors 820, one or more computer-readable RAMs 822 and one or more computer-readable ROMs 824 on one or more buses 826, one or more operating systems 828, and one or more computer-readable tangible storage devices 830. The one or more operating systems 828 and programs 200 and 300 in computer 110, as well as any necessary operating systems and other software in messaging server 150, are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 200 and 300 in computer 110, as well as any necessary software in messaging server 150 can be stored on one or more of the respective portable computer-readable tangible storage devices 936, read via the respective R/W drive or interface 832 and loaded into the respective hard drive 830.

Each set of internal components 800 a, b, c also includes one or more network adapters or interfaces 836 such as a TCP/IP adapter cards, wireless Wi-Fi interface cards, or 3G or 4G wireless interface cards or other wired or wireless communication links. The programs 200 and 300 in computer 110, as well as any necessary software in messaging server 150 can be downloaded to the respective computer systems from an external computer via a network (for example, the Internet, a local area network or other, wide area network) and respective network adapters or interfaces 836. From the one or more network adapters or interfaces 836, programs 200 and 300 in computer 110, as well as any necessary software in messaging server 150, are loaded into the respective hard drive 830. The network may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices. Each of the sets of internal components 800 a, b, c also includes device drivers 840 to interface to computer display monitor 920, keyboard 930 and computer mouse 934. The device drivers 840, R/W drive or interface 832, and one or more network adapters or interfaces 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise forms disclosed. Many modifications and variations are possible. Such modifications and variations that may be apparent to a person skilled in the art of the invention are intended to be included within the scope of the invention as defined by the accompanying claims.

What is claimed is:

1. A method for providing to a user creating an electronic message on a device with a user interface one or more alerts related to content and addressees of the electronic message, the method comprising the steps of:
   a computer identifying the one or more addressees of the electronic message;
   the computer identifying content of the electronic message;
   the computer determining, based, at least in part, on the identified content of the electronic message, one or more preferences of at least one of the identified one or more addressees of the electronic message;
   the computer determining one or more alerts associated with the one or more preferences;
   the computer displaying the one or more alerts on the user interface; and
   the computer identifying content of one or more electronic messages stored in a storage device, the stored electronic messages sent to the user from an addressee;
   the computer determining the identified content includes one or more sentences that are questions and one or more sentences that are non-questions;
   the computer storing the identified content in the storage device according to whether the one or more sentences are questions or non-questions;

the computer identifying the content of the created electronic message to identify one or more sentences of the created electronic message;

the computer determining the identified content of the created electronic message includes one or more sentences that are questions and one or more sentences that are non-questions;

the computer comparing the one or more non-questions of the created electronic message with the one or more questions of the stored electronic messages to determine if all stored questions of the addressee are answered, and the computer displaying one or more alerts on the display that includes a list of open questions if one or more questions are not answered.

2. The method of claim 1, wherein each step is performed prior to the computer transmitting the electronic message for delivery to the one or more addressees.

3. The method of claim 1, wherein the electronic message is selected from the group consisting of: an e-mail, an instant message, a MMS, a SMS, and a blog post.

4. A computer program product for providing to a user creating an electronic message on a device with a user interface one or more alerts related to content and addressees of the electronic message, the computer program product comprising:

one or more computer-readable, tangible storage devices and program instructions stored on at least one of the one or more storage devices, wherein the one or more computer-readable, tangible storage devices are hardware, the program instructions comprising;

program instructions to identify the one or more addressees of the electronic message;

program instructions to identify content of the electronic message;

program instructions to determine, based, at least in part, on the identified content of the electronic message, one or more preferences of at least one of the identified one or more addressees of the electronic message;

program instructions to determine one or more alerts associated with the one or more preferences;

program instructions to display the one or more alerts on the user interface; and program instructions to identify content of one or more electronic messages stored in a storage device, the stored electronic messages sent to the user from an addressee;

program instructions to determine the identified content includes one or more sentences that are questions and one or more sentences that are non-questions;

program instructions to store the identified content in the storage device according to whether the one or more sentences are questions or non-questions;

program instructions to identify the content of the created electronic message to identify one or more sentences of the created electronic message;

program instructions to determine the identified content of the created electronic message includes one or more sentences that are questions and one or more sentences that are non-questions;

program instructions to compare the one or more non-questions of the created electronic message with the one or more questions of the stored electronic messages to determine if all stored questions of the addressee are answered; and program instructions to display the one or more alerts on the display that includes a list of open questions if one or more questions are not answered.

5. The computer program product of claim 4, wherein the program instructions to each step is performed prior to the computer transmitting the electronic message for delivery to the one or more addressees.

6. The computer program product of claim 4, wherein the electronic message is selected from the group consisting of: an e-mail, an instant message, a MMS, a SMS, and a blog post.

7. A computer system for providing to a user creating an electronic message on a device with a user interface one or more alerts related to content and addressees of the electronic message, the computer system comprising:

one or more processors, one or more computer-readable memories and one or more computer-readable tangible storage devices, wherein the one or more computer-readable memories and the one or more computer-readable tangible storage devices are hardware;

program instructions, stored on at least one of the one or more storage devices for execution by at least one of the one or more processors via at least one of the one or more memories, to identify the one or more addressees of the electronic message;

program instructions to identify content of the electronic message;

program instructions to determine, based, at least in part, on the identified content of the electronic message, one or more preferences of at least one of the identified one or more addressees of the electronic message;

program instructions, stored on at least one of the one or more storage devices for execution by at least one of the one or more processors via at least one of the one or more memories, to determine one or more alerts associated with the one or more preferences;

program instructions, stored on at least one of the one or more storage devices for execution by at least one of the one or more processors via at least one of the one or more memories, to display the one or more alerts on the user interface; and program instructions, stored on at least one of the one or more storage devices for execution by at least one of the one or more processors via at least one of the one or more memories, to identify content of one or more electronic messages stored in a storage device, the stored electronic messages sent to the user from an addressee;

program instructions, stored on at least one of the one or more storage devices for execution by at least one of the one or more processors via at least one of the one or more memories, to determine the identified content includes one or more sentences that are questions and one or more sentences that are non-questions;

program instructions, stored on at least one of the one or more storage devices for execution by at least one of the one or more processors via at least one of the one or more memories, to store the identified content in the storage device according to whether the one or more sentences are questions or non-questions;

program instructions, stored on at least one of the one or more storage devices for execution by at least one of the one or more processors via at least one of the one or more memories, to identify the content of the created electronic message to identify one or more sentences of the created electronic message;

program instructions, stored on at least one of the one or more storage devices for execution by at least one of the one or more processors via at least one of the one or more memories, to determine the identified content of the created electronic message includes one or more sentences that are questions and one or more sentences that are non-questions;

program instructions, stored on at least one of the one or more storage devices for execution by at least one of the one or more processors via at least one of the one or more memories, to compare the one or more non-questions of the created electronic message with the one or more questions of the stored electronic messages to determine if all stored questions of the addressee are answered; and program instructions, stored on at least one of the one or more storage devices for execution by at least one of the one or more processors via at least one of the one or more memories, to display the one or more alerts on the display that includes a list of open questions if one or more questions are not answered.

8. The computer system of claim 7, wherein each step is performed prior to the computer transmitting the electronic message for delivery to the one or more addressees.

9. The computer system of claim 7, wherein the electronic message is selected from the group consisting of: an e-mail, an instant message, a MMS, a SMS, and a blog post.

* * * * *